United States Patent
Macholdt et al.

(10) Patent No.: US 6,406,528 B1
(45) Date of Patent: Jun. 18, 2002

(54) USE OF IMPROVED CYAN PIGMENTS IN INKJET INKS

(75) Inventors: Hans-Tobias Macholdt, Darmstadt-Eberstadt; Ruediger Baur, Eppstein; Eduard Michel, Frankfurt; Josef Geisenberger, Sulzbach; Heidemarie Menzel, Bad Soden; Andreas Harz, Waghaeusel, all of (DE)

(73) Assignee: Clariant GmbH, Frankfurt (DE)

( * ) Notice: Subject to any disclaimer, the term of this patent is extended or adjusted under 35 U.S.C. 154(b) by 0 days.

(21) Appl. No.: 09/993,840

(22) Filed: Nov. 16, 2001

Related U.S. Application Data

(62) Division of application No. 09/591,747, filed on Jun. 12, 2000, now Pat. No. 5,391,507.

(30) Foreign Application Priority Data

Jun. 18, 1999 (DE) .......................... 199 27 835

(51) Int. Cl.$^7$ .............................................. C09D 11/02
(52) U.S. Cl. .................................. 106/31.49; 106/411
(58) Field of Search ............................ 106/31.49, 411; 540/123, 140

(56) References Cited

U.S. PATENT DOCUMENTS

| | | | | |
|---|---|---|---|---|
| 3,652,602 A | | 3/1972 | Schafer et al. | 260/391 |
| 3,671,553 A | | 6/1972 | Papenfuss et al. | 260/392 |
| 4,370,270 A | * | 1/1983 | Bock et al. | 106/410 |
| 4,912,006 A | | 3/1990 | Breitschaft et al. | 430/110 |
| 5,015,676 A | | 5/1991 | Macholdt et al. | 523/453 |
| 5,021,473 A | | 6/1991 | Macholdt et al. | 523/451 |
| 5,051,585 A | | 9/1991 | Koshishiba et al. | 250/306 |
| 5,069,994 A | | 12/1991 | Gitzel et al. | 430/110 |
| 5,108,504 A | | 4/1992 | Johnson et al. | 106/31.36 |
| 5,147,748 A | | 9/1992 | Gitzel et al. | 430/110 |
| 5,250,111 A | * | 10/1993 | Langley et al. | 106/31.67 |
| 5,278,019 A | | 1/1994 | Ciccarelli et al. | 430/110 |
| 5,342,723 A | | 8/1994 | Macholdt et al. | 430/110 |
| 5,346,792 A | | 9/1994 | Kobayashi et al. | 430/109 |
| 5,378,571 A | | 1/1995 | Macholdt et al. | 430/110 |
| 5,475,119 A | | 12/1995 | Baur et al. | 548/570 |
| 5,502,118 A | | 3/1996 | Macholdt et al. | 525/437 |
| 5,585,216 A | | 12/1996 | Baur et al. | 430/110 |
| 5,700,617 A | | 12/1997 | Takiguchi et al. | 430/110 |
| 5,882,390 A | * | 3/1999 | Nagai et al. | 106/31.49 |
| 5,964,929 A | * | 10/1999 | Langley et al. | 106/31.49 |
| 6,030,738 A | | 2/2000 | Michel et al. | 430/110 |
| 6,083,653 A | | 7/2000 | Baur et al. | 430/110 |

FOREIGN PATENT DOCUMENTS

| | | |
|---|---|---|
| CA | 1 160 402 | 1/1984 |
| DE | 33 06 400 A1 | 8/1984 |
| DE | 197 11 260 A1 | 9/1998 |
| EP | 0 042 507 | 12/1981 |
| EP | 0 123 523 | 10/1984 |
| EP | 0 258 651 A2 | 3/1988 |
| EP | 0 385 580 A1 | 9/1990 |
| EP | 0 516 434 A1 | 12/1992 |
| EP | 0 526 012 | 2/1993 |
| EP | 0 636 945 A1 | 2/1995 |
| EP | 0 768 576 | 4/1997 |
| EP | 0 778 501 A1 | 6/1997 |
| EP | 0 893 737 | 1/1999 |
| GB | 1 483 418 | 8/1977 |
| JP | 53-51241 A | 5/1978 |
| JP | 3-048864 A | 3/1984 |
| JP | 59-155467 A | 9/1984 |
| JP | 1-159666 A | 6/1989 |
| JP | 2-10373 A | 1/1990 |
| JP | 4-301648 A | 10/1992 |
| WO | WO91/10172 | 7/1991 |

OTHER PUBLICATIONS

Schlösser et al., Proceedings of IS&T's Eleventh International Congress on Advances in Non–Impact Printing Technologies, pp. 110–112, No date available.

G.M. Sessler, "Electrets", Topics in Applied Physics, vol. 33, Springer Verlag, New York, Heidelberg, $2^{nd}$ Ed., 1987, No Month Avail.

Y. Higashiyama, Journal of Electrostatics, 30 (1993) pp. 203–212, No Month Available.

P. Gregory, Topics in Applied Chemistry: High Technology Application of Organic Colorants, Plenum Press, New York 1991, pp. 15–25, No Month Available.

Handbook of Imaging Materials, 1991, Marcel Dekker, Inc., Chapter 6, Liquid Toner Technology, No Month Avail.

Diamond, Arthur S., Handbook of Imaging Materials, New York: Marcel–Dekker, Inc. (1991) p. 169, No Month Avail.

Clariant GmbH "Visuelle and Farbmetrische Bewetung von Pigmenten" Visual and Colorimetric Evaluation of Pigments, Version 3, 1996 (No. 1/1), No Month Available.

CHEMIA 48 (1994) pp. 516–517, Hans–Tobias Macholdt, "Full Color Copying", No Month Available.

"Charging Effects on Organic Pigments in Electrophotographic Toners", by Macholdt. Dyes and Pigments 9 pp. 119–127, 1988.

CAS Registry No. 84179–66–8, No Date Available.
CAS Registry No. 115706–73–5, No Date Available.
CAS Registry No. 31714–55–3, No Date Available.
CAS Registry No. 84030–55–7, No Date Available.
CAS Registry No. 42405–40–3, No Date Available.
CAS Registry No: 116810–46–9, No Date Available.

(List continued on next page.)

Primary Examiner—Helene Klemanski
(74) Attorney, Agent, or Firm—Susan S. Jackson; Scott E. Hanf

(57) ABSTRACT

The present invention relates to the use of a CuPc composition consisting essentially of CuPc, e.g., C.I. Pigment Blue 15:3, and a hydroxymethylphthalimido CuPc, as a colorant in electrophotographic toners and developers, powders and powder coating materials, electret materials, inkjet inks, and color filters, wherein the phthalocyanines have a particle morphology with an average length-to-width ratio of more than 2.5:1.

10 Claims, No Drawings

OTHER PUBLICATIONS

Patent Abstract for DE 4029652, Mar. 1992.
Patent Abstract for EP 0813117, Dec. 1997.
Chemical Abstracts 115:218803 (1991), No Month Available.
Chemical Abstracts 113:88224 (1990), No Month Available.
Chemical Abstracts 112:108565 (1990), No Month Available.
Abstract for JP Patent No. 57141453—XP–002149242, Sep. 1982.
Derwent Patent Family Abstract for DE Patent No. 33 06 400, Aug. 1984.
Patent Abstract for EP 0 123 253, Oct. 1984.
EPO Search Report, Oct. 2000.

* cited by examiner

USE OF IMPROVED CYAN PIGMENTS IN INKJET INKS

This application is a divisional of Ser. No. 09/591,747, filed Jun. 12, 2000, now U.S. Pat. No. 6,391,507.

BACKGROUND OF THE INVENTION

The present invention relates to the use of a certain copper phthalocyanine composition in electrophotographic toners and developers, powder coating materials and inkjet inks.

In electrophotographic recording techniques a "latent charge image" is produced on a photoconductor. This latent charge image is developed by applying an electrostatically charged toner which is then transferred, for example, to paper, textiles, foils or plastic and is fixed by means, for example, of pressure, radiation, heat, or the action of a solvent. Typical toners are one- or two-component powder toners (also called one- or two-component developers); furthermore, special toners are employed, examples being magnetic or liquid toners, latex toners, polymerization toners and microencapsulated toners based on wax, for example.

One measure of the quality of a toner is its specific charge q/m (charge per unit mass). In addition to the sign and level of the electrostatic charge, the rapid attainment of the desired charge level and the constancy of this charge over a prolonged activation period, in particular, is a decisive quality criterion. Moreover, the insensitivity of the toner to climatic effects such as temperature and atmospheric humidity is another important criterion for its suitability.

Both positively and negatively chargeable toners are used in photocopiers, laser printers, LED (light emitting diode), LCS (liquid crystal shutter) printers or other digital printers based on electrophotography, depending on the type of process and type of equipment.

In order to obtain electrophotographic toners or developers with either a positive or a negative charge it is common to add charge control agents. As the color-imparting component in color toners, use is typically made of organic color pigments. As compared with dyes, color pigments have considerable advantages on account of their insolubility in the application medium, such as improved thermal stability and lightfastness, for example.

On the basis of the principle of subtractive color mixing it is possible, with the aid of the three primary colors yellow, cyan and magenta, to reproduce the entire spectrum of colors visible to the human eye. Exact color reproduction is only possible if the particular primary color satisfies the precisely defined color requirements. If this is not the case, some shades cannot be reproduced and the color contrast is inadequate.

In the case of full color toners, the three toners yellow, cyan and magenta must not only meet the precisely defined color requirements but must also be matched exactly to one another in their triboelectric properties, since they are transferred one after another in the same device.

6- and 7-color systems are likewise known. The base colors are red, green, blue, cyan, magenta, yellow and black. It is also possible to produce full color prints by the Pantone Hexachrome® system with the colors cyan, magenta, yellow, black, orange and green.

It is known that colorants may have a long-term effect on the triboelectric charging of toners. As a result, it is normally not possible simply to add the colorants to a toner base formulation once prepared. It may instead be necessary to prepare a specific formulation for each colorant, with the nature and amount of the required charge control agent being tailored specifically. This approach is, correspondingly, laborious and in the case of color toners for process color is just another difficulty to add to those already described above.

Furthermore, it is important for practical use that the colorants possess high thermal stability and good dispersibility. Typical temperatures for incorporation of colorants into the toner resins are between 100° C. and 200° C. when using compounders or extruders. Accordingly, a thermal stability of 200° C., or even better 250° C., is a great advantage. It is also important that the thermal stability is maintained over a prolonged period (about 30 minutes) and in different binder systems. Typical toner binders are resins formed by addition polymerization, polyaddition and polycondensation, such as styrene, styrene-acrylate, styrene-butadiene, acrylate, polyester and phenol-epoxy resins, polysulfones and polyurethanes, individually or in combination.

Fundamentally there is a need for color pigments possessing a very high degree of transparency, good dispersibility and a low inherent electrostatic effect: as far as possible a neutral inherent triboelectric effect. Neutral inherent triboelectric effect means that the pigment has very little or no effect on the inherent electrostatic charging of the resin and readily follows a defined charge established by means, for example, of charge control agents.

Transparency is of great importance since, in the case of full color copies or in printing, the colors yellow, cyan and magenta are copied or printed over one another, the sequence of colors depending on the device. Consequently, if an overlying color is not sufficiently transparent, then the underlying color is unable to show through to a-sufficient extent and the color reproduction is distorted. In the case of copying or printing on sheets for overhead projection use, transparency is even more important, since in this case a lack of transparency even in just one color makes the whole of the projected image gray.

The cyan shade, furthermore, is of great importance since it is used both in four-color printing and in 6- or 7-color printing.

SUMMARY OF THE INVENTION

The object of the present invention is to provide an improved cyan pigment satisfying the above requirements for use in electrophotographic toners and developers, powder coating materials, inkjet inks, color filters, and electret fibers.

This object has surprisingly been achieved by the use of the copper phthalocyanine composition de fined hereinbelow.

DESCRIPTION OF THE PREFERRED EMBODIMENTS

The present invention provides for the use of a copper phthalocyanine composition consisting essentially of a compound of the formula (I)

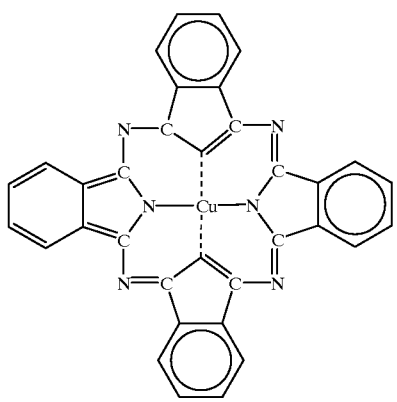

(I)

and of a compound of the formula (II)

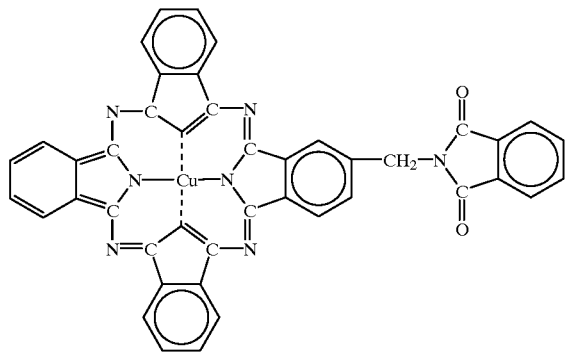

(II)

as a colorant in electrophotographic toners and developers, powders and powder coating materials, electret materials, inkjet inks, and color filters, wherein the compounds of the formulae (I) and (II) have a particle morphology with an average length-to-width ratio of more than 2.5:1, preferably from 3:1 to 6:1.

The relative proportions of the compound of the formula (I) to the compound of the formula (II) can fluctuate within wide limits; for example, from 0.1:99.9% by weight to 99.9:0.1% by weight. Preference is given to compositions of from 80 to 99.5% by weight of the compound of the formula (I) and from 0.5 to 20% by weight of the compound of the formula (II). Particular preference is given to compositions of from 90 to 99% by weight of the compound of the formula (I) and from 1 to 10% by weight of the compound of the formula (II).

The compound of the formula (I) is known per se (DE-A-2 432 564) and is in commerce under the designation C.I. Pigment Blue 15. The β-modification is preferred, being known under the names C.I. Pigment Blue 15:3 and 15:4. Also suitable in principle, however, are the α-modification (C.I. Pigment Blue 15:1 and 15:2, from 0.5 to 1 Cl) and the ∈-modification (C.I. Pigment Blue 15:6).

The compound of the formula (II) is known per se and can be prepared in analogy to EP-A-0 508 704 by reacting the N-methylol-phthalimide with a phthalocyanine.

Conventional C.I. Pigment Blue 15, especially 15:3, possesses a very pronounced intrinsic triboelectric effect (e.g., U. Schlösser et al., Society of Imaging Science and Technology, 11th Congress on Advances in Non-impact Printing Technology, Hilton Head, SC, Oct. 29–Nov. 11, 1995, Proceedings pp 110–112) which can be overcome only with great effort and in many cases only partly by means, for example, of adding charge control agents, which is very expensive.

It is novel and surprising that the phthalocyanine composition used in accordance with the invention and having the stated particle morphology possesses a very stable and neutral intrinsic triboelectric effect and exhibits a significant improvement in respect of transparency and dispersibility. The intrinsic triboelectric effect is the influence of the colorant on the electrostatic charging of the binder. The normal aim is that the colorant should not alter the charging behavior of the binder. Ideally, irrespective of the addition of colorant, the binder has the same charge per mass after the same activation time. The fact that a needle-shaped (acicular) particle morphology in the copper phthalocyanine composition of the invention leads to a stable and neutral intrinsic triboelectric effect was very surprising, since it is known from EP-A-0 813 117 that the colorant used therein has an intrinsic triboelectric effect which is more stable and neutral the less the extent to which the pigment particles are needle-shaped, i.e., the greater the extent to which the pigment particles are cube-shaped—in other words, precisely the opposite of the present case. It was further surprising that the copper phthalocyanine composition of the invention despite its needle-shaped particle morphology has high flocculation stability, ready dispersibility, in aqueous and nonaqueous media, and high color strength and luster. Ease of dispersibility is of importance not only for toners, powder coating materials and electret materials but also, in particular, for inkjet inks, since in this case the pigment dispersion must be extremely fine in order not to block the very fine printer nozzles.

Furthermore, the copper phthalocyanine composition thus prepared has a high negative particle surface charge: for example, in the range from −60 to −300 mV/mg, in particular from −60 to −120 mV/mg.

The phthalocyanine composition of the invention can be prepared by finely dividing crude copper phthalocyanine with a suitable grinding apparatus—for example, on a ball-mill or beadmill—subjecting the finely divided copper phthalocyanine to a solvent finish in aqueous-organic or organic medium at a temperature of from 20 to 200° C. for a period of time permitting crystal growth, e.g., at least ½ hour, preferably from 2 to 10 hours, and then adding the phthalimidomethylene CuPc. Examples of suitable organic media are alcohols, such as n- or i-butanol, ketones, such as methyl ethyl ketone, methyl isobutyl ketone or diethyl ketone and carboxamides, such as DMF or dimethylacetamide.

As well as in electrophotographic toners and developers, the copper phthalocyanine composition can also be used as colorant in powders and coating materials, especially in triboelectrically or electrokinetically sprayed powder coating materials as used to coat the surfaces of articles made, for example, from metal, wood, textile material, paper or rubber. The powder coating or powder obtains its electrostatic charge in general by one of the two following methods:

a) in the case of the corona method, the powder coating material or powder is guided past a charged corona and is charged in the process;

b) in the case of the triboelectric or electrokinetic method, the principle of frictional electricity is utilized.

Typical powder coating resins employed are epoxy resins, carboxyl- and hydroxyl-containing polyester resins, polyurethane resins and acrylic resins together with the customary hardeners. Resin combinations are also used. For example, epoxy resins are frequently employed in combination with carboxyl- and and hydroxyl-containing polyester resins.

Furthermore, the improved triboelectric behavior of the colorant may result in an improvement in the electret properties in the case of colored (pigmented) electret materials, typical electret materials being based on polyolefins, halogenated polyolefins, polyacrylates, polyacrylonitriles, polystyrenes or fluoropolymers, examples being polyethylene, polypropylene, polytetrafluoroethylene and perfluorinated ethylene and propylene, or on polyesters, polycarbonates, polyamides, polyimides, polyether ketones, on polyarylene sulfides, especially polyphenylene sulfides, on polyacetals, cellulose esters, polyalkylene terephthalates, and mixtures thereof. Electret materials have numerous fields of use and may acquire their charge through corona charging or triboelectric charging (ref.: G. M. Sessler, "Electrets", Topics in Applied Physics, Vol. 33, Springer Verlag, New York, Heidelberg, 2nd Ed., 1987).

Furthermore, the improved triboelectric influence of the colorant may result in improved separation characteristics of colored (pigmented) polymers which are separated by electrostatic methods (Y. Higashiyau, J. of Electrostatics, 30, pages 203–212, 1993). Accordingly, the inherent triboelectric effect of pigments is important for the mass coloring of plastics as well. The inherent triboelectric effect is also significant in process or processing steps which involve intense frictional contact, examples being spinning processes, film-drawing processes or other shaping processes.

Furthermore, the phthalocyanine composition is also suitable as a colorant for color filters, both for subtractive and for additive color generation (P. Gregory "Topics in Applied Chemistry: High Technology Application of Organic Colorants" Plenum Press, New York 1991, pp. 15–25).

A task frequently encountered in connection with electrophotographic color toners, powder coating materials or inkjet inks is to shade the hue and adapt it to the requirements of the specific application. Particularly appropriate for this purpose are further organic color pigments, inorganic pigments, and dyes. Further organic color pigments can be used in mixtures with the copper phthalocyanine composition in concentrations between 0.01 and 50% by weight, preferably between 0.1 and 25% by weight and, with particular preference, between 0.1% and 15% by weight, based on the copper phthalocyanine composition. The further organic color pigments can be from the group of the azo pigments or polycyclic pigments.

Preferred blue and/or green pigments for shading are the respective other copper phthalocyanines, such as C.I. Pigment Blue 15, 15:1, 15:2, 15:3, 15:4, 15:6, P. Blue 16 (metal-free phthalocyanine), or phthalocyanines with aluminum, nickel, iron or vanadium as the central atom, and also triarylcarbonium pigments, such as Pigment Blue 1, 2, 9, 10, 14, 62 and Pigment Green 1, 4 and 45. Mixtures of one or more components are likewise suitable. Relatively large steps in hue are possible, for example, using orange pigments such as P.O. 5, 62, 36, 34, 13, 43 and 71; yellow pigments such as P.Y. 12, 13, 17, 83, 93, 122, 155, 180, 174, 185 and 97; red pigments such as P.R. 48, 57, 122, 146, 184, 186, 202, 207, 209, 254, 255, 270 and 272; or violet pigments such as P.V. 1 and 19. The mixtures can be prepared in the form of powders, by mixing presscakes, spray-dried presscakes or masterbatches and by dispersion (extrusion, kneading, roll-mill processes, bead mills, Ultra-Turrax) in the presence of a carrier material in solid or liquid form (aqueous and nonaqueous inks) and by flushing in the presence of a carrier material. If the colorant is used with high proportions of water or solvent (>5%), then mixing can also take place at elevated temperatures with vacuum assistance.

Particularly appropriate for increasing the brightness but also for shading the hue are mixtures with organic dyes. Preferred such dyes are water-soluble dyes, such as direct, reactive and acid dyes, and also solvent-soluble dyes, such as solvent dyes, disperse dyes and vat dyes. Specific examples that may be mentioned are C.I. Reactive Yellow 37, Acid Yellow 23, Reactive Red 23,180, Acid Red 52, Reactive Blue 19, 21, Acid Blue 9, Direct Blue 199, Solvent Yellow 14, 16, 25, 56, 62, 64, 79, 81, 82, 83, 83:1, 93, 98, 133, 162, 174, Solvent Red 8, 19, 24, 49, 89, 90, 91, 92, 109, 118, 119, 122, 124, 127, 135, 160, 195, 212, 215, Solvent Blue 44, 45, Solvent Orange 41, 60, 63, Disperse Yellow 64, Vat Red 41, and Solvent Black 45, 27.

It is also possible to use dyes and pigments having fluorescent properties, such as ®Luminols (Riedel-de Haen), in concentrations of from 0.0001 to 10% by weight, preferably from 0.001 to 5% by weight and, with very particular preference, between 0.01 and 1%, based on the phthalocyanine composition, in order, for example, to produce anticounterfeit toners.

Inorganic pigments, such as $TiO_2$ or $BaSO_4$, are used in mixtures for lightening. Also suitable are mixtures with effect pigments, such as pearl luster pigments, $Fe_2O_3$ pigments (®Paliochromes) and pigments based on cholesteric polymers, for example, which give different perceived colors depending on the viewing angle.

The copper phthalocyanine composition employed in accordance with the invention can also be combined with charge control agents, providing either positive or negative control, in order to achieve defined charging performance. The simultaneous use of positive and negative charge control agents is a further option.

Examples of suitable charge control agents are:
triphenylmethanes; ammonium and immonium compounds; iminium compounds; fluorinated ammonium and fluorinated immonium compounds; biscationic acid amides; polymeric ammonium compounds; diallylammonium compounds; aryl sulfide derivatives; phenol derivatives; phosphonium compounds and fluorinated phosphonium compounds; calix(n)arenes; cyclically linked oligosaccharides (cyclodextrins) and their derivatives, especially boron ester derivatives, interpolyelectrolyte complexes (IPECs); polyester salts; metal complex compounds, especially carboxylate-metal, salicylate-metal and salicylate-nonmetal complexes, aluminum-azo complexes, α-hydroxycarboxylic acid-metal and -nonmetal complexes; boron complexes of 1,2-dihydroxyaromatics, 1,2-dihydroxyaliphatics or 2-hydroxy-1-carboxyaromatics; benzimidazolones; and azines, thiazines or oxazines which are listed in the Colour Index as Pigments, Solvent Dyes, Basic Dyes or Acid Dyes.

Examples of charge control agents which can be combined individually or in combination with one another with the phthalocyanine composition of the invention are:
triarylmethane derivatives such as, for example:
Colour Index Pigment Blue 1, 1:2, 2, 3, 8, 9, 9:1, 10, 10:1, 11, 12, 14, 18, 19, 24, 53, 56, 57, 58, 59, 61, 62, 67 or, for example, Colour Index Solvent Blue 2, 3, 4, 5, 6, 23, 43, 54, 66, 71, 72, 81, 124, 125, and also the triarylmethane compounds listed in the Colour Index under Acid Blue and Basic Dye, provided they are suitable in terms of their thermal stability and processing properties, such as, for example, Colour Index Basic Blue 1, 2, 5, 7, 8, 11, 15, 18, 20, 23, 26, 36, 55, 56, 77, 81, 83, 88, 89, Colour Index Basic Green 1, 3, 4, 9, 10, with Colour Index Solvent Blue 125, 66 and 124 in-turn possessing special suitability. Colour Index Solvent Blue 124, in the form of its highly crystalline sulfate or of the trichlorotriphenylmethyltetrachloroaluminate, is particularly suitable. Metal complexes bearing the CAS Numbers 84179-66-8 (chromium azo complex), 115706-73-5 (iron azo complex), 31714-55-3 (chromium azo complex), 84030-55-7 (chromium salicylate complex), 42405-40-3 (chromium salicylate complex) and also the quaternary ammonium compound CAS No. 116810-46-9 and also aluminum azo complex dyes, metal carboxylates and sulfonates.

Examples of charge control agents of the triphenylmethane series that are highly suitable for the production of electret fibers are the compounds described in DE-A-1 919 724 and DE-A-1 644 619.

Of particular interest are triphenylmethanes as described in U.S. Pat. No. 5,051,585, especially those of the formula (2)

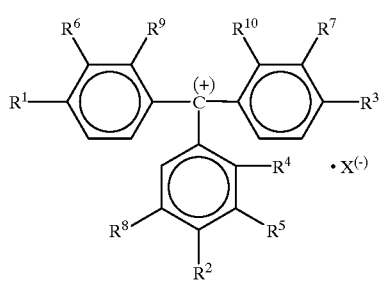

in which $R^1$ and $R^3$ are phenylamino groups, $R^2$ is an m-methylphenylamino group, and the radicals $R^4$ to $R^{10}$ are all hydrogen.

Also suitable are ammonium and immonium compounds as described in U.S. Pat. No. 5,015,676, and fluorinated ammonium and immonium compounds as described in U.S. Pat. No. 5,069,994, especially those of the formula (3)

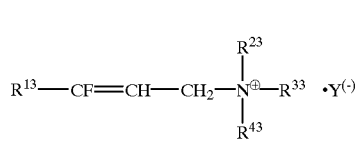

in which $R^{13}$ is perfluorinated alkyl of 5 to 11 carbon atoms, $R^{23}$, $R^{33}$ and $R^{43}$ are identical or different and are alkyl of 1 to 5, preferably 1 to 2, carbon atoms, and $Y^-$ is a stoichiometric equivalent of an anion, preferably of a tetrafluoroborate or tetraphenylborate anion.

Also suitable are biscationic acid amides, as described in WO 91/10172.

Further suitable compounds are diallylammonium compounds as described in DE-A-4,142,541 and also the polymeric ammonium compounds obtainable therefrom of the formula (6), as described in DE-A-4 029 652 or DE-A-4 103 610

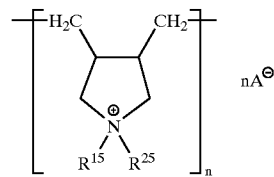

in which n has a value corresponding to molecular weights of from 5000 to 500,000 g/mol, preferably molecular weights of from 40,000 to 400,000 g/mol.

Also suitable are aryl sulfide derivatives as described in DE-A-4 031 705, especially those of the formula (7)

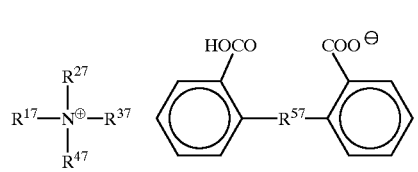

in which $R^{17}$, $R^{27}$, $R^{37}$ and $R^{47}$ are identical or different alkyl groups of 1 to 5, preferably 2 or 3, carbon atoms, and $R^{57}$ is one of the divalent radicals —S—, —S—S—, —SO— and —SO$_2$.

For example, $R^{17}$ to $R^{47}$ are propyl groups and $R^{57}$ is the group —S—S—.

Also suitable are phenol derivatives as described in EP-A-0 258 651, especially those of the formula (8)

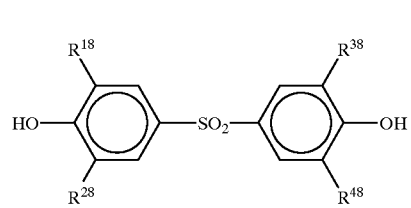

in which $R^{18}$ and $R^{38}$ are alkyl or alkenyl groups of 1 to 5, preferably 1 to 3, carbon atoms and $R^{28}$ and $R^{48}$ are hydrogen or alkyl of 1 to 3 carbon atoms, preferably methyl.

Also suitable are phosphonium compounds and fluorinated phosphonium compounds, as described in U.S. Pat. No. 5,021,473 and in U.S. Pat. No. 5,147,748.

Other suitable compounds include calix(n)arenes, as described in EP-A-0 385 580, EP-A-0 516 434 and in Angew. Chemie (1993), 195, 1258.

Further suitable compounds are metal complex compounds, such as chromium-, cobalt-, iron-, zinc- or aluminum-azo complexes or chromium-, cobalt-, iron-, zinc- or aluminum-salicylic or boric acid complexes of the formula (14)

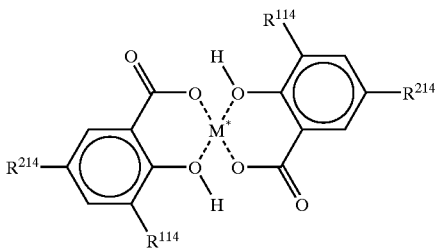

(14)

in which
M* is a divalent central metal atom, preferably a chromium, aluminum, iron, boron or zinc atom,
$R^{114}$ and $R^{214}$ are identical or different straight-chain or branched alkyl groups of 1 to 8, preferably 3 to 6, carbon atoms, an example being tert-butyl.

Also suitable are benzimidazolones as described in EP-A-0 347 695.

Further suitable compounds are cyclically linked oligosaccharides as described in DE-A4 418 842.

Further suitable compounds are polymer salts, as described in DE-A-4 332 170, especially the product described in Example 1 thereof.

Also suitable are cyclooligosaccharide compounds, as are described, for example, in DE-A-1 971 1260, which are obtainable by reacting a cyclodextrin or cyclodextrin derivative with a compound of the formula

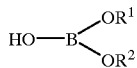

in which $R^1$ and $R^2$ are alkyl, preferably $C_1$-$C_4$-alkyl.

Also suitable are interpolyelectrolyte complexes as are described, for example, in DE-A-197 32 995. Particularly suitable such compounds are those featuring a molar ratio of polymeric cationic to polymeric anionic groups of from 0.9:1.1 to 1.1:0.9.

Further suitable compounds, especially for use in liquid toners (Handbook of Imaging Materials, 1991, Marcel Dekker, Inc., Chapter 6, Liquid Toner Technology), are surface-active ionic compounds and what are known as metal soaps.

Particularly suitable are alkylated arylsulfonates, such as barium petronates, calcium petronates, barium dinonylnaphthalenesulfonates (basic and neutral), calcium dinonylsulfonate or sodium dodecylbenzenesulfonate, and polyisobutylenesuccinimides (Chevron's ®Oloa 1200). Soya lecithin and N-vinylpyrrolidone polymers are also suitable. Also suitable are sodium salts of phosphated mono- and diglycerides of saturated and unsaturated substituents, AB diblock copolymers of A: polymers of 2-(N,N)-dimethylaminoethyl methacrylate quaternized with methyl p-toluenesulfonate, and B: poly-2-ethylhexyl methacrylate.

Also suitable, especially in liquid toners, are divalent and trivalent carboxylates, especially aluminum tristearate, barium stearate, chromium stearate, magnesium octoate, calcium stearate, iron naphthalite and zinc naphthalite.

Suitability extends to chelating charge control agents, as described in EP 0 636 945 A1, metallic (ionic) compounds, as described in EP 0 778 501 A1, phosphate metal salts, as described in JA 9 (1997)-106107, azines of the following Colour Index Numbers: C.I. Solvent Black 5, 5:1, 5:2, 7, 31 and 50; C.I. Pigment Black 1, C.I. Basic Red 2 and C.I. Basic Black 1 and 2.

The combination of phthalocyanine composition of the invention and charge control agents can be effected by means of physical mixing of the respective powders, presscakes or masterbatches, or by appropriate application to the surface of the pigment (pigment coating). Both components can also advantageously be added in the case of polymerization toners, for which the binder is polymerized in the presence of the copper phthalocyanine composition of the invention and, if appropriate, of the charge control agent, or can be used in the preparation of liquid toners in high-boiling inert solvents, such as hydrocarbons.

The copper phthalocyanine composition of the invention is also suitable for aqueous-based electrocoagulation toners.

The invention therefore also provides an electrophotographic toner or developer comprising a toner binder, from 0.1 to 60% by weight, preferably from 0.5 to 20% by weight, of shaded or unshaded phthalocyanine composition, and from 0 to 20% by weight, preferably from 0.1 to 5% by weight, based in each case on the overall weight of the toner or developer, of a charge control agent from the class of the triphenylmethanes, ammonium and immonium compounds; fluorinated ammonium and immonium compounds; biscationic acid amides; polymeric ammonium compounds; diallylammonium compounds; aryl sulfide derivatives; phenol derivatives; phosphonium compounds and fluorinated phosphonium compounds; calix(n)arenes; cyclodextrins; polyester salts; metal complex compounds; cyclooligosaccharide-boron complexes, interpolyelectrolyte complexes; benzimidazolones; azines, thiazines or oxazines.

It is also possible to add further components to the toner, such as waxes, which may be of animal, vegetable or mineral origin, synthetic waxes, or mixtures thereof. Waxes are understood to be substances which are kneadable at 20° C., ranging from firm to hard and fragile, from coarse to finely crystalline, and from translucent to opaque, but not grasslike. In addition, a light stabilizer can be added to the toner. Subsequently, free flow agents, such as $TiO_2$ or highly disperse silica, can also be added to the toner.

The invention additionally provides a powder or powder coating material comprising an acrylic resin or polyester resin containing epoxy, carboxyl or hydroxyl groups, or a combination of such resins, from 0.1 to 60% by weight, preferably from 0.5 to 20% by weight, of shaded or unshaded phthalocyanine composition, and from 0 to 20% by weight, preferably from 0.1 to 5% by weight, based in each case on the overall weight of the powder or powder coating material, of a charge control agent selected from the preferred compounds and classes mentioned above for electrophotographic toners.

The phthalocyanine composition used in accordance with the invention is judiciously incorporated homogeneously, for example by extrusion or kneading, or added during the polymerization of the binder, in a concentration of from 0.1 to 60% by weight, preferably from 0.5 to 20% by weight and, with particular preference, from 0.1 to 5.0% by weight, based on the overall mixture, into the binder of the respective toner (liquid or dry), developer, powder coating material, electret material or polymer for electrostatic separation. In this context, the copper phthalocyanine composition and, if appropriate, the abovementioned charge control agent can also be added in the form of dried and ground powders, dispersions or suspensions in, for example, organic and/or inorganic solvents, presscakes (which can be used, for example, for the flush process), spray-dried presscakes, masterbatches, preparations, made-up pastes, and as compounds applied to suitable carriers, examples being kieselguhr, $TiO_2$, $Al_2O_3$, from aqueous or nonaqueous solution, or in some other form. The phthalocyanine content in the presscake and masterbatch is usually between 5 and 70% by weight, preferably between 20 and 50% by weight. Furthermore, the phthalocyanine composition can also be used as a highly concentrated presscake, especially as a spray-dried presscake, in which case the phthalocyanine content is between 25 and 95% by weight, preferably between 50 and 90% by weight.

The level of the electrostatic charge of the electrophotographic toners or of the powder coatings into which the pigment of the invention is homogeneously incorporated cannot be predicted and is measured on standard test systems under identical conditions (identical dispersion times, identical particle size distribution, identical particle morphology) at approximately 20° C. and 50% relative atmospheric humidity. The electrostatic charging of the toner is carried out by fluidization with a carrier, i.e. a standardized friction partner (3 parts by weight of toner per 97 parts by weight of carrier) on a bed of rolls (150 revolutions per minute). Subsequently, the electrostatic charging is measured on a customary q/m measurement setup.

The triboelectric spraying of the powders or powder coating materials is carried out using a spraying apparatus with a standard spray pipe and a star-shaped inner rod at maximum powder throughput with a spray pressure of 3 bar. For this purpose, the article to be sprayed is suspended in a spray booth and is sprayed from a distance of about 20 cm directly from the front, without any further movement of the spraying apparatus. The charge of each sprayed powder is then measured using a "Device for measuring the triboelectric charge of powders" from Intec (Dortmund). To carry out the measurement, the antenna of the measuring device is held directly in the cloud of powder emerging from the spraying apparatus. The current strength resulting from the electrostatic charge of powder coating material or powder is displayed in $\mu$A. The deposition rate is determined subsequently in % by differential weighing of the sprayed and of the deposited powder coating material.

The transparency and color strength in toner binder systems is investigated as follows: 30 parts by weight of the pigmented test toner are stirred with a dissolver (5 minutes at 5000 rpm) into 70 parts by weight of a base varnish (consisting of 15 parts by weight of the respective toner resin and 85 parts by weight of ethyl acetate).

The test toner varnish produced in this way is knife-coated onto suitable paper (e.g., letterpress paper), using a manual coater, against a standard pigmented varnish produced in the same way. A suitable size for the coater bar is, for example, K bar N 3 (=24 $\mu$m coat thickness). To allow better determination of transparency, the paper has printed on it a black bar, and the transparency and color strength differences in terms of dL values are determined in accordance with DIN 55 988 or evaluated in accordance with the test procedure from Pigments Marketing, Clariant GmbH "Visuelle und Farbmetrische Bewertung von Pigmenten" [Visual and calorimetric evaluation of pigments] version 3, 1996 (No. 1/1).

It has also been found that the copper phthalocyanine composition is suitable as a colorant in aqueous (including microemulsion inks) and nonaqueous ("solvent-based") inkjet inks, and in those inks which operate in accordance with the hot-melt technique.

Microemulsion inks are based on organic solvents, water and, if desired, an additional hydrotropic substance (interface mediator). Nonaqueous inks contain essentially organic solvents and, if desired, a hydrotropic substance.

The present invention additionally provides inkjet recording liquids which comprise the phthalocyanine composition.

The finished recording liquids generally include from 0.5 to 15% by weight, preferably from 1.5 to 8% by weight, of the copper phthalocyanine composition, based on the overall weight of the recording liquid.

Microemulsion inks consist essentially of from 0.5 to 15% by weight, preferably from 1.5 to 8% by weight of the phthalocyanine composition, from 5 to 99% by weight of water and from 0.5 to 94.5% by weight of organic solvent and/or hydrotropic compound.

"Solvent based" inkjet inks consist essentially of from 0.5 to 15% by weight of the phthalocyanine composition and from 85 to 94.5% by weight of an organic solvent and/or hydrotropic compound. Carrier materials for "solvent based" inkjet inks can be polyolefins, natural rubber and synthetic rubber, polyvinyl chloride, vinyl chloride/vinyl acetate copolymers, polyvinyl butyrates, wax/latex systems or combinations thereof which are soluble in the "solvent".

Hot-melt inks are based predominantly on organic compounds, such as waxes, fatty acids, fatty alcohols or sulfonamides, which are solid at room temperature and liquefy when heated, the preferred melting range lying between about 60° C. and about 140° C.

The invention also provides a hot-melt inkjet ink consisting essentially of from 20 to 90% by weight of wax and from 1 to 10% by weight of the phthalocyanine composition, unshaded or shaded by further colorants, from 0 to 20% by weight of an additional polymer (as "colorant dissolver"), from 0 to 5% by weight of dispersing auxiliaries, from 0 to 20% by weight of viscosity modifiers, from 0 to 20% by weight of plasticizers, from 0 to 10% by weight of tack additive, from 0 to 10% by weight of transparency stabilizer (prevents, e.g., crystallization of waxes), and from 0 to 2% by weight of antioxidant.

The solvents present in the recording liquids described above can comprise an organic solvent or a mixture of such solvents. Examples of suitable solvents are mono- or polyhydric alcohols, their ethers and esters, e.g., alkanols, especially those of 1 to 4 carbon atoms, such as methanol, ethanol, propanol, isopropanol, butanol and isobutanol; dihydric or trihydric alcohols, especially those of 2 to 5 carbon atoms, examples being ethylene glycol, propylene glycol, 1,3-propanediol, 1,4-butanediol, 1,5-pentanediol, 1,6-hexanediol, 1,2,6-hexanetriol, glycerol, diethylene glycol, dipropylene glycol, triethylene glycol, polyethylene glycol, tripropylene glycol, polypropylene glycol; lower alkyl ethers of polyhydric alcohols, such as, for example, ethylene glycol monomethyl, monoethyl or monobutyl ether, triethylene glycol monomethyl or monoethyl ether; ketones and ketone alcohols such as, for example, acetone, methyl ethyl ketone, diethyl ketone, methyl isobutyl ketone, methyl pentyl ketone, cyclopentanone, cyclohexanone and diacetone alcohol; amides, such as dimethylformamide, dimethylacetamide, N-methylpyrrolidone, toluene and n-hexane, for example.

Water used to prepare the recording liquids is used preferably in the form of distilled or deionized water.

Hydrotropic compounds, which may also act as solvents, include for example formamide, urea, tetramethylurea, ε-caprolactam, ethylene glycol, diethylene glycol, triethylene glycol, polyethylene glycol, butyl glycol, methyl-Cellosolve, glycerol, N-methylpyrrolidone, 1,3-diethyl-2-imidazolidinone, thiodiglycol, sodium benzenesulfonate, Na xylenesulfonate, Na toluenesulfonate, sodium cumenesulfonate, Na dodecylsulfonate, Na benzoate, Na salicylate or sodium butyl monoglycol sulfate.

The recording liquids of the invention may also include other customary additives, examples being preservatives, cationic, anionic or nonionic surface-active substances (surfactants and wetting agents), and also viscosity regulators, e.g., polyvinyl alcohol, cellulose derivatives, or water-soluble natural or synthetic resins as film formers and/or binders for increasing the adhesive strength and abrasion resistance.

Amines, such as ethanolamine, diethanolamine, triethanolamine, N,N-dimethyl-ethanolamine or diisopropylamine, for example, serve primarily to increase the pH of the recording liquid. They are normally present in the recording liquid in a proportion of from 0 to 10%, preferably from 0.5 to 5%, by weight.

The inkjet inks of the invention can be prepared by dispersing the copper phthalocyanine composition—in the form of a powder, an aqueous or nonaqueous preparation, a suspension or a presscake—into the microemulsion medium or into the aqueous or nonaqueous medium or into the wax for preparing a hot-melt inkjet ink. The presscake can also be a highly concentrated presscake, especially a spray-dried presscake.

In addition to printing on paper, natural and synthetic fiber materials, films or plastics, inkjet inks can also be used on glass, ceramic, concrete and the like.

EXAMPLES

In the examples below, parts and percentages are by weight. CuPc denotes copper phthalocyanine.

Synthesis Example 1

1.1 Preparation of Crude Copper Phthalocyanine

The synthesis of C.I. Pigment Blue 15:3 (copper phthalocyanine, β modification) takes place, for example, as decribed in DE-A-24 32 564, Example 1. The crude copper phthalocyanine produced in this way is subsequently suspended in water and ground in a laboratory ball mill for 24 hours.

1.2 Preparation of the Phthalimidomethyl-CuPc Additive

In a 1 liter reaction vessel, 216 ml of water, 90 g of formalin (35% strength) and 120 g of phthalimide are combined with stirring at room temperature and subsequently heated to 100° C. A clear solution is formed, which is cooled. The reaction product which precipitates is filtered off, washed and dried.

Yield (dry): 136 g of hydroxymethylphthalimide.

In a 1 liter reaction vessel, 32 g of crude copper phthalocyanine from Synthesis Example 1.1 are added slowly with stirring to 240 ml of 98% strength sulfuric acid at 35° C.

Subsequently, 40 g of the hydroxymethylphthalimide are added slowly. The reaction mixture is heated to about 80° C., then cooled to room temperature and poured into an ice-water mixture. The precipitate is filtered and washed.

Yield: 260 g of presscake (20% solids content) of phthalimidomethyl-CuPc.

1.3 Solvent Finish

In a 500 ml reaction vessel, 50 g of the crude CuPc described under 1.1 are stirred at room temperature into 100 ml of water. Then 100 ml of methyl ethyl ketone are added and the mixture is boiled at reflux (74° C.) for 2 hours with stirring. The solvent is distilled off under atmospheric pressure (about 80° C.) with the simultaneous slow addition of 100 ml of H$_2$O. Subsequently, at about 80° C., 6.25 g of the phthalimidomethyl-CuPc presscake described under 1.2 are added. The reaction mixture thus obtained is stirred for several hours at 60–80° C. The end product is filtered off, washed, filtered off with suction and subsequently dried and ground.

Yield: 50 g of blue pulverulent copper phthalocyanine composition.

| Product characterization: | |
|---|---|
| pH | 6.5 |
| Residual moisture content (baking flask) | 0.3% |
| Residual salt content: | 70 µS/cm |
| BET surface area: | 61.3 m$^2$/g |
| Particle size: | |
| d$_{25}$: | 0.08 µm |
| d$_{50}$: | 0.1 µm |
| d$_{75}$: | 0.13 µm |
| Particle morphology (length-to-width ratio) | |
| Total sample: | 3.06:1 |
| Fine fraction | 2.87:1 |
| Middle fraction | 3.19:1 |
| Coarse fraction | 3.13:1 |

Particle size and particle morphology are determined by means of an electron micrograph of the pigment powder. For this purpose the pigment is dispersed for 15 minutes in water and subsequently applied by spraying. The micrographs are taken at 13,000 and 29,000 times magnification.

Thermalstability: A DTA (differential thermoanalysis, 3° C./min heating rate, closed glass ampule) shows a thermal-stability of distinctly more than 200° C.

X-ray diffraction diagram (CuK$_V$ radiation):

2 theta (s=strong, m=moderate, w=weak):

| 2 Theta | Intensity (relative intensity) | Width at half peak height (2 theta) |
|---|---|---|
| 7.0 | 100% | 0.28 |
| 9.2 | 76% | 0.28 |
| 10.5 | 14% | 0.28 |
| 12.5 | 13% | 0.26 |
| 18.2 | 17% | 0.2 |
| 18.5 | 17% | 0.2 |
| 21.4 | 12% | 0.2 |
| 23.0 | 11% | 0.22 |
| 23.8 | 40% | 0.24 |
| 26.2 | 28% | 0.26 |
| 28.0 | 15% | 0.24 |
| 30.4 | 16% | 0.25 |

Transparency

In a toner resin (bisphenol A based polyester) an improved transparency is measured (24 µm layer thickness), the pigmented test toner being prepared as in Application Example 2.

Relative to the standard indicated in Synthesis Example 2 (comparative), a transparency higher by 4–5 points is found after adjusting for equal color strength.

Evaluation of the transparency differences in accordance with test specification 1/1: 1Δtrace, 2Δsomewhat; 3Δmarkedly; 4Δdistinctly; 5Δsubstantially; 6Δsignificantly more transparent.

Color strength: Relative to the standard indicated in Synthesis Example 2, the pigment from Synthesis Example 1 is 10% stronger in color.

Particle Surface Charge

The electrokinetic particle surface charge is determined as described in Chimia 48 (1994) 516–517 and the literature cited therein. For a measured sample volume of 2 ml and a pigment concentration of 5 g/l, the corresponding pigment particle surface charge is obtained in mV/mg, the measurements being taken in each case in the acid range, in the alkaline range and at the intrinsic pH of the substance sample:

| pH | mV/mg |
|---|---|
| acidic (4.1) | −60 |
| intrinsic pH (6.5) | −71 |
| alkaline (10.0) | −93 |

Synthesis Example 2 (Comparative Example)

The pigment used is ®Hostaperm Blue B2G (C.I. Pigment Blue 15:3, unsubstituted copper phthalocyanine) which is commonly used in numerous toners and is prepared, for example, in accordance with DE-A-3 023 722. The CuPc additive was not added.

| Pigment characterization | |
|---|---|
| pH | 6.4 |
| Residual moisture content (baking flask) | 0.2% |
| Residual salt content: | 50 µS/cm |
| BET surface area: | 50.2 m²/g |
| Particle size | |
| $d_{25}$: | 0.07 µm |
| $d_{50}$: | 0.09 µm |
| $d_{75}$: | 0.11 µm |
| Particle morphology (length-to-width ratio) | |
| Total sample: | 2.67:1 |
| Fine fraction | 2.33:1 |
| Middle fraction | 2.62:1 |
| Coarse fraction | 2.96:1 |

Synthesis Example 3 (Comparative Example)

20 g of the crude CuPc described under Synthesis Example 1.1 are introduced into 300 ml of 66.5% strength sulfuric acid at 35° C. The suspension is stirred at 35° C. for 2.5 hours and then poured into 320 ml of water. The mixture is heated to 80° C. and stirred at 80° C. for 1 hour. It is then filtered and washed with water in order to extract the sulfuric acid.

The presscake is stirred together with water to form a readily stirrable suspension, and 10.7 g of 20% strength phthalimidomethyl-CuPc presscake are added at room temperature. The mixture is then heated to 135° C. under superatmospheric pressure and stirred at 135° C. for 7 hours. The product is filtered at 60° C., washed, dried at 80° C. and pulverized:

| pH | 6.5 |
|---|---|
| Residual moisture content (baking fask) | 0.3% |
| Residual salt content: | 70 µS/cm |
| BET surface area: | 49 m²/g |
| Particle size | |
| $d_{25}$: | 0.08 µm |
| $d_{50}$: | 0.1 µm |
| $d_{75}$: | 0.17 µm |
| Particle morphology (length-to-width ratio) | |
| Total sample: | 1.62:1 |
| Fine fraction | 2.07:1 |
| Middle fraction | 1.92:1 |
| Coarse fraction | 1.38:1 |

Application Examples for Toners 5 parts of the respective colorant are incorporated homogeneously using a kneading apparatus into 95 parts of a toner binder (polyester resin based on bisphenol A, ®Almacryl T500) over the course of 30 minutes. The product is then ground on a universal laboratory mill and classified on a centrifugal classifier. The desired particle fraction (from 4 to 25 µm) is activated with a carrier consisting of silicone-coated ferrite particles of size 50 to 200 µm (bulk density 2.75 g/cm³) (FBM 96–100; from Powder Tech.).

Measurement is carried out on a conventional q/m measurement setup. A sieve having a mesh size of 25 µm is used to ensure that no carrier is entrained when the toner is blown out. The measurements are made at a relative atmospheric humidity of approximately 50%. As a function of the activation period, the following q/m values [µC/g] are measured:

| Application Example | Toner system | Activation period/q/m in [µC/g] | | | | |
|---|---|---|---|---|---|---|
| | | 5 min | 10 min | 30 min | 2 h | 24 h |
| 1 (resin line) | Polyester resin only, no colorant | −20 | −20 | −17 | −13 | −8 |
| 2 | Polyester resin + 5% colorant from Synthesis Ex. 1 | −19 | −12 | −8 | −6 | −4 |
| 3 (comparative) | Polyester resin + 5% colorant from Synthesis Ex. 2 | −12 | −9 | −3 | +2 | +3 |
| 4 (comparative) | Polyester resin + 5% colorant from Synthesis Ex. 3 | −18 | −6 | −3 | −2 | 0 |

It is found that the toner containing the colorant of the invention (Application Example 2) best follows the charging behavior of the resin line (Application Example 1).

Application Example 5

5 parts of the colorant from Synthesis Example 1 and 1 part of the charge control agent of the formula

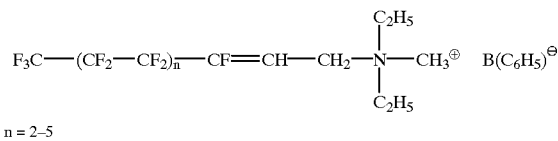

n = 2–5 are incorporated into a polyester toner binder and subjected to measurement. As a function of the activation period, the following q/m values are measured:

| Activation period | q/m [μC/g] |
|---|---|
| 5 min | −13 |
| 10 min | −11 |
| 30 min | −10 |
| 2 h | −9 |
| 23 h | −9 |

Very good charging constancy over the entire activation period is found.

Application Example 5

5 parts of the colorant from Synthesis Example 1 and 1 part of the charge control agent of the formula

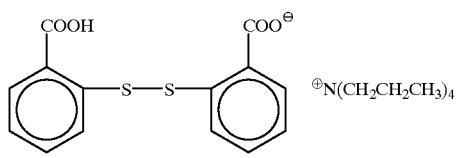

are incorporated into a styrene-acrylate toner binder and subjected to measurement.

As a function of the activation period, the following q/m values are measured:

| Activation period | q/m [μC/g] |
|---|---|
| 5 min | +2 |
| 10 min | +3 |
| 30 min | +4 |
| 2 h | +3 |
| 23 h | +2 |

Very good charging constancy over the entire activation period is found.

Application Examples for Inkjet Inks

Application Example 7

10 parts of a finely ground 50% pigment preparation with the colorant from Synthesis Example 1 (5 parts) in polyvinyl chloride/polyvinyl acetate copolymer (5 parts), the homogeneous colorant dispersion being obtained by intensive kneading into the copolymer, are introduced with stirring into a mixture of 80 parts of methyl isobutyl ketone and 10 parts of 1,2-propylene glycol, using a dissolver. An inkjet ink having high transparency, lightfastness and good passage through the nozzles is obtained.

Application Example 8

5 parts of colorant from Synthesis Example 1, in the form of a 40% ultrafine aqueous pigment preparation, are admixed with stirring (paddle stirrer or dissolver) first with 75 parts of deionized water and then with 6 parts of ®Mowilith DM 760 (acrylate dispersion), 2 parts of ethanol, 5 parts of 1,2-propylene glycol and 0.2 part of ®Mergal K7. This gives an inkjet ink having high transparency, high lightfastness and good passage through the nozzles.

Application Example 9

5 parts of colorant from Synthesis Example 1, in the form of a 40% ultrafine aqueous pigment preparation, are admixed with stirring first with 80 parts of deionized water and then with 4 parts of ®Luviskol K 30 (polyvinylpyrrolidone, BASF), 5 parts of 1,2-propylene glycol and 0.2 parts of ®Mergal K7. This gives an inkjet ink having high transparency, hight lightfastness and good passage through the nozzles.

Application Example of Powder Coating Materials

Application Example 10

5 parts of the colorant from Synthesis Example 1 are incorporated homogeneously into 95 parts of a powder coating binder based on a TGIC polyester, e.g., ®Uralac P 5010 (DSM, Netherlands). In order to determine the deposition rate, 30 g of the test powder coating material are sprayed through a triboelectric gun at a defined pressure.

| Pressure [bar] | Current [μA] | Deposition rate [%] |
|---|---|---|
| 3 | 1.8 | 78 |

What is claimed is:

1. A method of using a copper phthalocyanine composition consisting essentially of a compound of the formula (I)

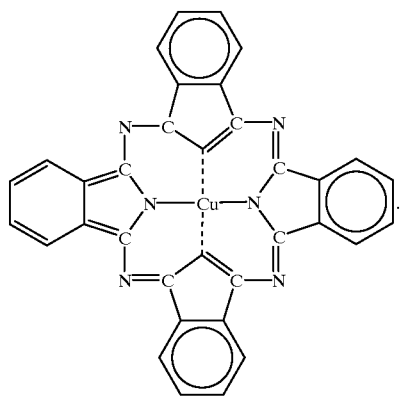

and of a compound of the formula (II)

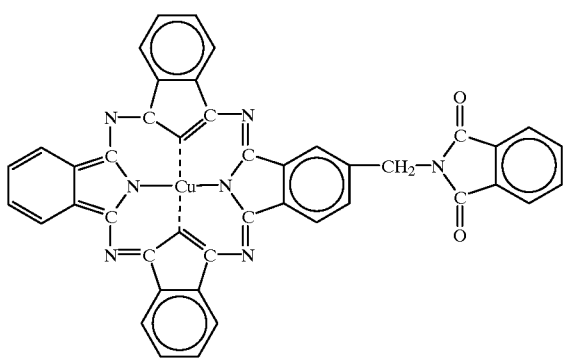

as a colorant in an inkjet ink, the method comprising incorporating the composition into an inkjet base, wherein the compounds of the formulae (I) and (II) have a particle morphology with an average length-to-width ratio of more than 2.5:1.

2. The method as claimed in claim 1, wherein the average length-to-width ratio is from 3:1 to 6:1.

3. The method as claimed in claim 1, wherein the compound of the formula (I) is in a quantitative ratio to the compound of the formula (II) of from 90:10 to 99:1 1% by weight.

4. The method as claimed in claim 1, wherein the compound of the formula (I) is C.I. Pigment Blue 15:3.

5. The method as claimed in claim 1, wherein the copper phthalocyanine composition is shaded with a further organic color pigment, an inorganic pigment, or a dye.

6. The method as claimed in claim 1, wherein the copper phthalocyanine composition is used in combination with a charge control agent selected from the group consisting of triphenylmethanes, ammonium compounds, immonium compounds, iminium compounds, fluorinated ammonium compounds, fluorinated immonium compounds, biscationic acid amides, polymeric ammonium compounds, diallylammonium compounds, aryl sulfide derivatives, phenol derivatives, phosphonium compounds, fluorinated phosphonium compounds, calix(n)arches, cyclically linked oligosaccharides and their derivatives, interpolyelectrolyte complexes, polyester salts, metal complex compounds, salicylate-nonmetal complexes, aluminum-azo complexes, α-hydroxycarboxylic acid-metal and -nonmetal complexes, boron complexes of 1,2-dihydroxyaromatics, 1,2-dihydroxyaliphatics and 2-hydroxy-1-carboxyaromatics, benzimidazolones, azines, thiazines, and oxazines.

7. An inkjet ink comprising from 0.5 to 15% by weight of a copper phthalocyanine composition, wherein the copper phthalocyanine composition consists essentially of a compound of the formula (1)

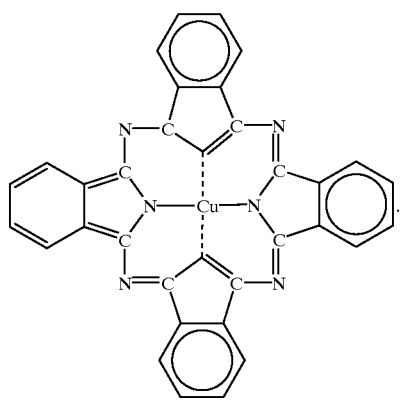

and of a compound of the formula (11)

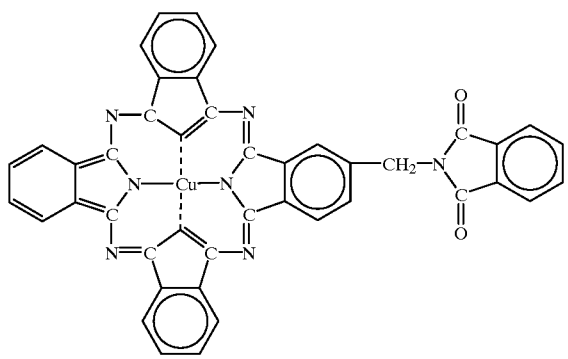

wherein the compounds of the formulae (II) and (II) have a particle morphology with an average length-to-width ratio of more than 2.5:1.

8. The inkjet ink as claimed in claim 7, wherein the inkjet ink is a microemulsion ink.

9. The inkjet ink as claimed in claim 7, wherein the inkjet ink is a solvent-based inkjet ink.

10. The inkjet ink as claimed in claim 7, wherein the inkjet ink is a hot-melt inkjet ink.

* * * * *